US012196242B2

(12) United States Patent
Grojean et al.

(10) Patent No.: US 12,196,242 B2
(45) Date of Patent: Jan. 14, 2025

(54) FASTENING COMPONENT, ASSEMBLY METHOD AND ASSEMBLY DEVICE

(71) Applicants: Maxime Grojean, Commercy (FR); Alex Grojean, Commercy (FR)

(72) Inventors: Maxime Grojean, Commercy (FR); Alex Grojean, Commercy (FR)

(*) Notice: Subject to any disclaimer, the term of this patent is extended or adjusted under 35 U.S.C. 154(b) by 273 days.

(21) Appl. No.: 17/260,917

(22) PCT Filed: Jul. 17, 2019

(86) PCT No.: PCT/FR2019/051799
§ 371 (c)(1),
(2) Date: Jan. 15, 2021

(87) PCT Pub. No.: WO2020/016528
PCT Pub. Date: Jan. 23, 2020

(65) Prior Publication Data
US 2021/0262511 A1    Aug. 26, 2021

(30) Foreign Application Priority Data

Jul. 17, 2018 (FR) ..................... 18/56582

(51) Int. Cl.
*F16B 25/00* (2006.01)
*F16B 5/02* (2006.01)

(52) U.S. Cl.
CPC ............ *F16B 25/0057* (2013.01); *F16B 5/02* (2013.01); *F16B 25/0021* (2013.01); *F16B 25/0073* (2013.01); *F16B 25/0094* (2013.01)

(58) Field of Classification Search
CPC ............. F16B 25/0057; F16B 25/0021; F16B 25/0073; F16B 25/0094; F16B 25/0078; F16B 25/106
See application file for complete search history.

(56) References Cited

U.S. PATENT DOCUMENTS 3,530,760 A * 9/1970 Lindstrand .......... F16B 25/0047
411/416
3,978,760 A * 9/1976 Muenchinger ......... B21H 3/027
411/386
(Continued)

FOREIGN PATENT DOCUMENTS

CN          1549901 A     11/2004
CN          1914427 A      2/2007
(Continued)

OTHER PUBLICATIONS

FR1428786A English translation (Year: 1965).*
DE-102014012142-A1 English translation (Year: 2016).*
DE-102011109815-A1 English translation (Year: 2013).*
(Continued)

*Primary Examiner* — Jason L Vaughan
*Assistant Examiner* — Amanda Kreiling
(74) *Attorney, Agent, or Firm* — CANTOR COLBURN LLP (57) ABSTRACT

This fastening component, which is intended to assemble a first part and a second part, includes a body extending longitudinally along an axis, a head configured to allow the fastening component to be rotated about the axis, and a tip connected to the body. The body has a side wall including fastening means configured to fasten the body to the first and second parts. The tip has a side wall having a shape different from that of a surface of revolution. The tip and the body are connected by a cleavable area configured to be broken in order to detach the tip from the body.

21 Claims, 4 Drawing Sheets

(56) References Cited

U.S. PATENT DOCUMENTS

| | | | |
|---|---|---|---|
| 4,958,972 | A | 9/1990 | Shinjo |
| 6,443,680 | B1 | 9/2002 | Bodin |
| 7,143,497 | B2 | 12/2006 | Panasik et al. |
| 7,367,768 | B2 | 5/2008 | Mcgovern et al. |
| 10,221,880 | B2 | 3/2019 | Zach et al. |
| 2014/0277188 | A1 | 9/2014 | Poulos |
| 2016/0199967 | A1 | 7/2016 | Stahl |

FOREIGN PATENT DOCUMENTS

| | | | | | |
|---|---|---|---|---|---|
| CN | 105164432 | A | | 12/2015 | |
| DE | 102011109815 | A1 | * | 2/2013 | ............ B21J 15/027 |
| DE | 102014012142 | A1 | * | 2/2016 | .......... F16B 25/0021 |
| EP | 370674 | A | * | 5/1990 | ............. B23K 11/14 |
| EP | 0370674 | A1 | | 5/1990 | |
| FR | 1428786 | A | * | 3/1965 | |
| WO | WO-2006039412 | A2 | * | 4/2006 | .......... F16B 25/0031 |

OTHER PUBLICATIONS

English Translation to International Search Report for Application No. PCT/FR2019/051799.
International Search Report for Application No. PCT/FR2019/051799.
Written Opinion for Application No. PCT/FR2019/051799.
Article 94(3) Communication dated Jan. 30, 2023; EP App. No. 19 759 644.8; 2 pages (non-English).
First Office Action and Search dated Mar. 9, 2022; CN Application No. 201980047887; 17 pages (English translation Included).
Opinion dated Mar. 29, 2019; FR Application No. 1856582; 6 pages (non-English).
Search Report dated Mar. 29, 2019; FR Application No. 1856582; 2 pages.
Second Office Action and Search dated Oct. 17, 2022; CN Application No. 201980047887; 15 pages (English translation included).
Third Office Action dated Mar. 10, 2023; CN Application No. 201980047887; 4 pages (Non-English).

\* cited by examiner

FASTENING COMPONENT, ASSEMBLY METHOD AND ASSEMBLY DEVICE

CROSS REFERENCE TO RELATED APPLICATIONS

This application is a National Stage of PCT Application No. PCT/FR2019/051799 filed on Jul. 17, 2019, which claims priority to French Patent Application No. 18/56582 filed on Jul. 17, 2018, the contents each of which are incorporated herein by reference thereto.

BACKGROUND

The present invention concerns a fastening component intended for the assembly of two parts, in particular in the context of a multi-material assembly, a method for assembling the two parts via this fastening component, as well as an assembly device intended for the implementation of this method.

It is known to assemble two sheet metals to each other by means of fastening components such as flow drill screws or nails. These fastening components comprise a tip which allows the drilling of the two sheet metals and a body which is intended to be inserted into the hole which is drilled by the tip in order to carry out the fastening of the two sheet metals. The tip conventionally has a single function of drilling the sheet metals and, after the assembly, the tip, secured to the body, remains protruding from the assembled sheet metals.

However, this remaining protruding tip has several drawbacks. A first drawback is a risk of injury for maintenance personnel or a user of a product including the sheet metals thus assembled. A second drawback is the space requirement generated by this protruding tip. A third drawback is the unnecessary weight represented by the tip in the assembly formed of assembled sheet metals, while the multi-material assemblies have in particular the advantage of lightening the structure they equip, such as for example a vehicle.

BRIEF SUMMARY

Also, the present invention aims at overcoming all or part of these drawbacks by proposing a fastening component allowing a multi-material assembly improving the safety, the compactness and the weight of the assembly, while ensuring an efficient and solid assembly.

To this end, the invention relates to a fastening component intended for the assembly of a first part and a second part, characterized in that the fastening component comprises:
   a body extending longitudinally along an axis A,
   a head configured to allow a rotation of the fastening component about the axis A, and
   a tip linked to the body, in which
   the body has a lateral wall comprising a fastener configured to fasten the body to the first and second parts,
   the tip has a lateral wall of a shape distinct from that of a surface of revolution, and
   the tip and the body are linked by a divisible area configured to be broken in order to detach the tip from the body.

Thus, the fastening component according to the invention allows a secure, efficient, lighter, secure, and compact fastening. By the non-revolving tip thereof, a kneading and therefore a heating of the material of the first and second parts facilitating an efficient piercing. The fastener for fastening body ensures the anchoring and the relative immobilization of the first and second parts. The divisible area allows the detachment of the tip, which therefore does not remain in the final assembly, thus saving space, weight and safety.

Advantageously, the body has a proximal end and an opposite distal end, the head being arranged at the proximal end of the body and the tip being arranged at the distal end of the body.

According to one embodiment, the divisible area is a portion of smaller section.

Thus, the divisible area can be made on a one-piece fastening component, so that the cost of the fastening component is reduced.

According to one embodiment, the fastener comprises one or several radially protruding element(s) arranged at a pitch P decreasing in a proximal direction, and/or the tip has one or several radially protruding element(s) of a diameter d increasing in the proximal direction.

Advantageously, the tip comprises a proximal portion and a distal portion, the proximal portion including one or several radially protruding element(s) arranged at predetermined pitch P and diameter d and the distal portion comprising the non-revolving shape.

According to one embodiment, at least the tip comprises an outer surface of a higher hardness, a higher thermal resistance and a lower coefficient of friction, than an inner material of the fastening component.

The outer surface can be formed of one or several superimposed layer(s). Advantageously, the tip comprises a coating having a first layer comprising a material which is thermally more insulating than an inner material of the tip, a second layer comprising a material of hardness which is higher than that of the inner material of the tip, and a third layer comprising a material which is thermally more conductive than the inner material of the tip. The first layer is preferably the outer layer. The first or second layer, or else an additional layer, may further have a coefficient of friction which is lower than that of an inner material of the tip.

According to one embodiment, the tip, or a distal portion of the tip, is directly mounted on the remainder of the fastening component and comprises a material distinct from a material of the remainder of the fastening component.

For example, having a tip made of a first material and the body of a second material distinct from the first material allows using a high performance tip with an economical body. In particular, a material of the tip or the distal portion thereof has a hardness which is higher than that of the remainder of the fastening component. In addition, this allows the divisible area to benefit from a surface treatment, in the case that the entire tip is directly mounted on the body.

According to another aspect, the invention relates to a method for assembling a first part and a second part via a fastening component having the aforementioned features, the method comprising the fact of:
   rotating the fastening component about the axis A;
   drilling the first and second parts by means of the tip of the fastening component;
   breaking the divisible area after the tip has drilled the first and second parts.

According to one embodiment, the breakage of the divisible area comprises the application, on the tip, of a force having a component orthogonal to the axis A.

According to one embodiment, this force is of a variable direction.

According to one embodiment, the method comprises shaping a collar around the body of the fastening component.

The fact of providing a guide of the material to shape the collar allows improving the mechanical strength.

According to another aspect, the invention also relates to an assembly device intended for the implementation of the aforementioned assembly method, the device comprising:
- a bearing tool configured to cause the breakage of the divisible area of the fastening component after the tip of the fastening component has drilled the first and second parts,
- a counter anvil having a housing intended to shape a collar around the body of the fastening component.

BRIEF DESCRIPTION OF THE FIGURES

Other features and advantages of the present invention will emerge clearly from the detailed description below of an embodiment, given by way of non-limiting example, with reference to the appended drawings in which.

DETAILED DESCRIPTION

Figure 1A:
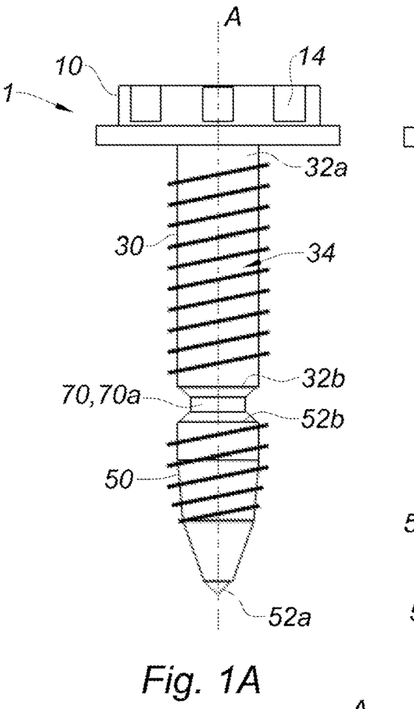
FIG. 1A is a side view of a fastening component according to an embodiment of the invention.

FIG. 1A shows a fastening component 1 according to one embodiment of the invention. The fastening component 1 is intended for the assembly of a first part 3 and a second part 5 which can be of different materials, for example respectively made of aluminum and steel. The first part 3 and the second part 5 can have a plate shape. For example, the first part 3 is a first sheet metal and the second part 5 is a second sheet metal 5. The fastening component 1 can also 10 allow the assembly of more than two stacked parts or sheet metals.

The fastening component 1 comprises a head 10, a body 30 and a tip 50. The body 30 extends longitudinally along an axis A. The body 30 has a proximal end 32a and an opposite distal end 32b. The head 10 is connected to the proximal end 32a of the body 30. The tip 50 is connected to the distal end 32b of the body 30.

The term «proximal end» means herein the end closest to the head of the component, where a thrust effort is applied, and the term «distal end» means the end furthest from the head and closest to the tip. Similarly, the distal direction is the direction of insertion of the fastening component in the first and second parts and the proximal direction is the opposite direction.

Figure 5A:
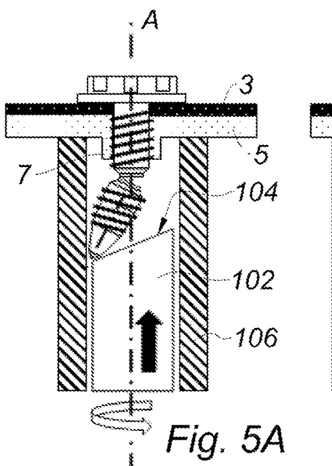
FIG. 5A is a view illustrating a step of an assembly method according to one embodiment of the invention.
Figure 5B:
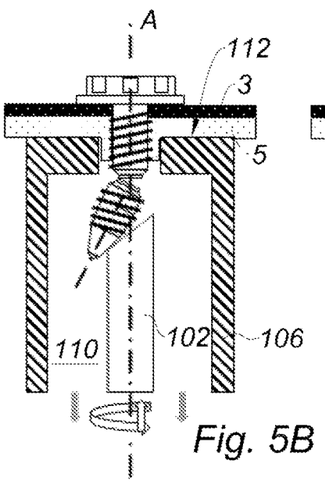
FIG. 5B is a view illustrating a step of an assembly method according to an embodiment of the invention.
Figure 5C:
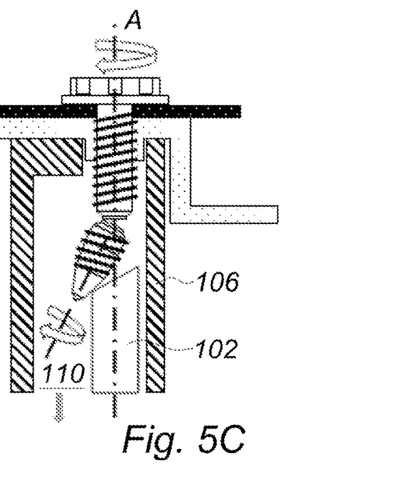
FIG. 5C is a view illustrating a step of an assembly method according to one embodiment of the invention.
Figures 5D, 6A:
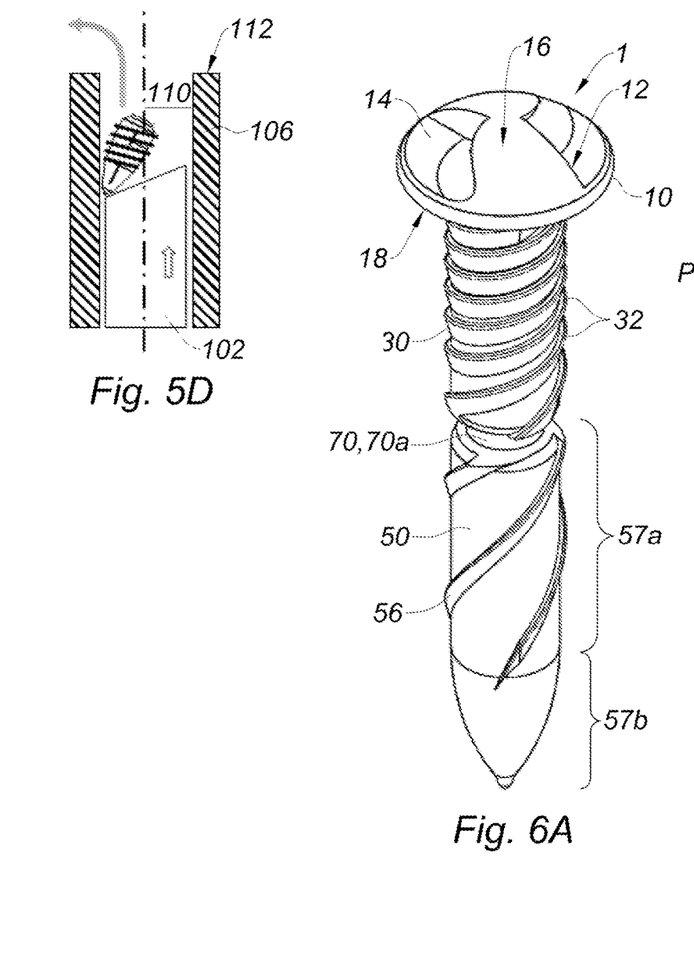
FIG. 5D is a view illustrating a step of an assembly method according to one embodiment of the invention.
FIG. 6A is a side view of a fastening component according to one embodiment of the invention.
Figure 6B:
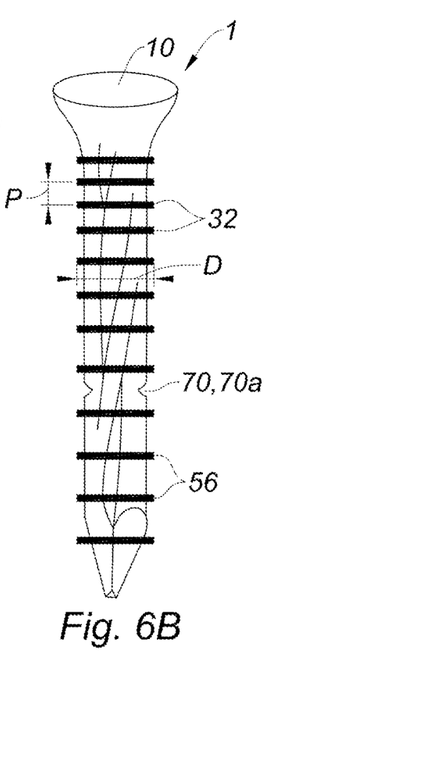
FIG. 6B is a side view of a fastening component according to one embodiment of the invention, FIG. 7A a side view of a fastening component according to one embodiment of the invention.

The head 10 is configured to allow the fastening component 1 to be rotated about the axis A. As illustrated in FIG. 6, the head 10 advantageously has for this purpose at least one rotational drive surface 12 which is arranged to allow a applying, on the head 10, a torque in order to pivot the fastening component 1 about the axis A. The head 10 can advantageously have a cavity 14 intended to receive a tool, preferably of complementary shape, to rotate the fastening component 1. The drive surface 12 at least partially delimits this cavity 14.

The head 10 is also configured to allow the application of a thrust force to push the fastening component 1 through the first and second parts 3, 5. For this purpose, the head 10 comprises a proximal bearing surface 16, which may correspond to the surface of the head 10 protruding from the cavity 14.

The head 10 can also comprise a distal bearing surface 18 configured to bear against the first part 3, specifically against an upper face 3a of the first part 3. This bearing surface 18 may have an annular shape.

The body 30 comprises a lateral wall 34 provided with a fastener configured to fasten the body 30 to the first and second parts 3, 5 and therefore immobilize the first and second parts 3, 5.

The fastener comprises one or several element(s) 32 radially protruding from the lateral wall 34. The radially protruding element(s) 32 are arranged at a predetermined pitch P along the axis A and define a predetermined diameter D.

Figure 2:
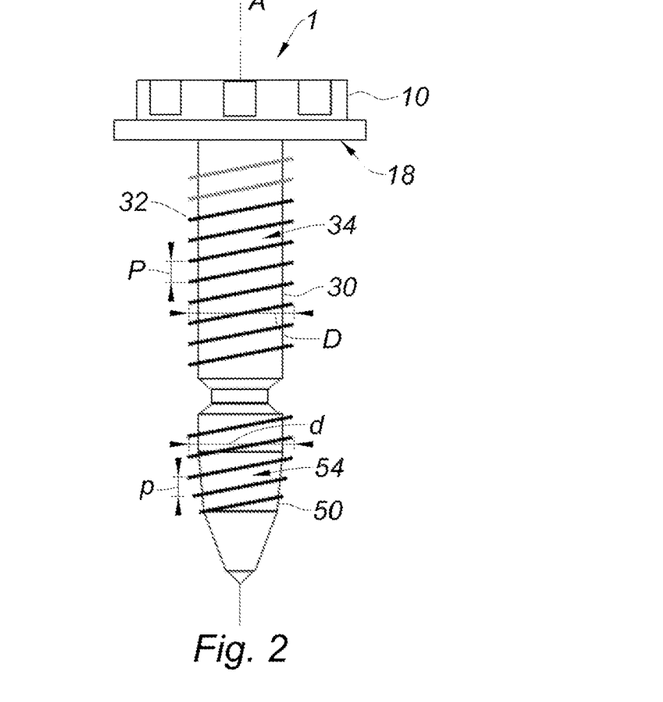
FIG. 2 is a side view of a fastening component according to an embodiment of the invention.

Preferably, as illustrated in FIGS. 2 and 6A, 6B, the pitch P is advantageously variable, and more specifically decreasing in the proximal direction. This allows increasing the plating of the first and second parts 3, 5 against each other while improving the cohesion between the body 30 and these first and second parts 3, 5. The diameter D can be constant or increasing in the proximal direction.

The protruding element(s) 32 may be a thread, a ring assembly for example formed of several rings 32, or the protrusions between the ridges resulting from a knurling. The radially protruding element(s) 32 are configured to be opposed to an axial relative movement and/or a relative rotation about the axis A of the first and second parts 3, 5. The radially protruding element(s) 32 extend at an angle or orthogonally relative to the axis A.

Alternatively or in a complementary manner, as shown on the lateral wall 34 of the body 30 may have a non-cylindrical shape. The lateral wall 34 therefore does not define a surface of revolution. For example, lateral wall 34 can be twisted.

Figure 1B:
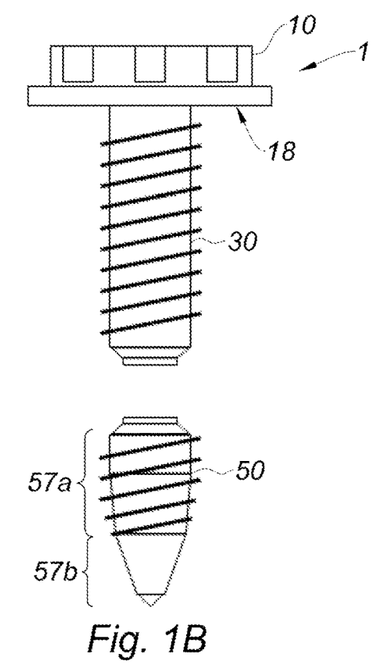
FIG. 1B is a side view of a fastening component according to an embodiment of the invention, after breakage of the divisible area.

The tip 50 comprises a distal end 52a and an opposite proximal end 52b. The tip 50 has a lateral wall 54. The tip 50 has an increasing cross section from the distal end 52a, in the proximal direction. The lateral wall 54 therefore flares in the proximal direction from the distal end 52a. As illustrated in FIG. 1B, the tip 50 may have a proximal portion 57a and a distal portion 57b.

Figure 8A:
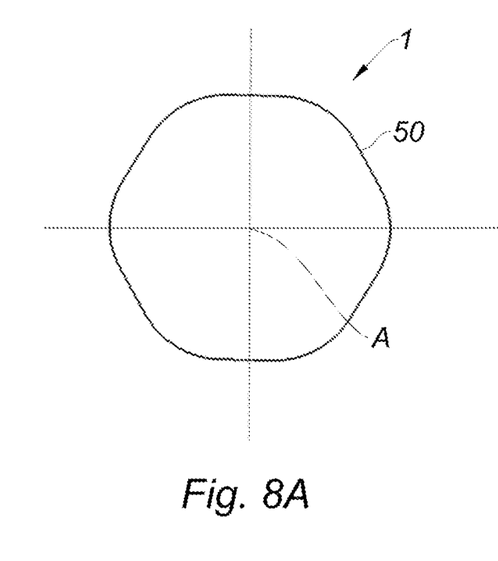
FIGS. 8A and 8B are orthogonal and top sectional views of a fastening component according to embodiments of the invention.
Figure 8B:
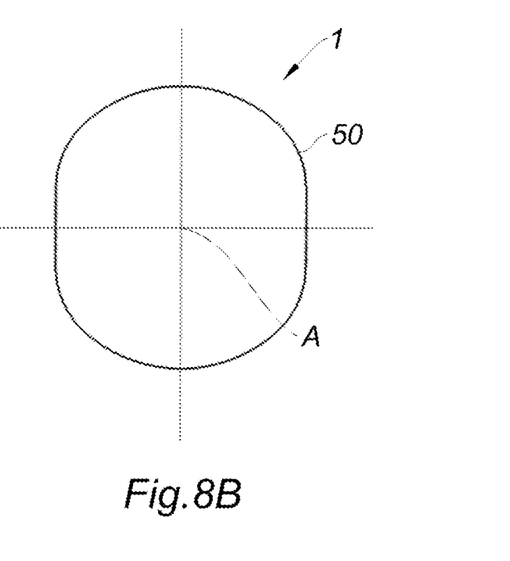

The tip 50, more specifically at least one portion of the lateral wall 54 thereof, has a non-revolving shape about the axis A, that is to say other than that of a surface of revolution, so as to create, when rotating the fastening component 1, a kneading and consequently a heating of the material of the first and second parts 3, 5, as shown for example in FIG. 6B. Thus, at least one portion of the tip 50 has a non-circular cross section, as illustrated in FIGS. 8A and 8B.

The non-revolving shape of the lateral wall 54 may be more particularly located at the distal portion 57b of the tip 50.

For example, the tip 50 may have sections, or flat surfaces, separated by protrusions, projections, edges or ribs extending longitudinally in a plane containing the axis A. For example, the tip 50 may have a cross section, i.e. orthogonal to the axis A, of an elliptic, ovoid, polygonal shape, etc.

The tip 50 may also include one or several element(s) 56 radially protruding from the lateral wall 54. The radially protruding element(s) 56 are arranged at a predetermined pitch p along the axis A and define a predetermined diameter d.

Preferably, as illustrated in FIGS. 2 and 6A, 6B, the diameter d is advantageously variable, and more specifically increasing in the proximal direction. This allows gradually forming in the first and second parts 3, 5 the complementary shapes in which the projecting elements 32 of the body 30 will be implanted to ensure the anchoring of the fastening component 1 in the first and second parts 3, 5. In order to promote this anchoring, the radially protruding element(s) 56 extend at an angle or orthogonally relative to the axis A. The pitch p can be constant.

The protruding element(s) 56 can be a thread, a ring assembly for example formed of several rings 56, or the protrusions between the ridges resulting from a knurling.

The protruding element(s) 56 are advantageously located at least on the proximal portion 57a of the tip 50. The distal portion 57b may be devoid thereof.

According to one embodiment, the tip 50 could be completely devoid of the protruding element 56. In this case, it may be advantageous that the diameter D of the radially protruding element(s) 32 of the body 30 is increasing in the proximal direction.

It should be noted that the largest cross section of the tip 50 advantageously remains less than or equal to the cross section of the body 30. However, according to an embodiment which is not represented, the fastening component 1 may have a portion with a larger cross section located upstream of the proximal part of the body 30, that is to say distally relative to the latter. This allows benefiting from an elastic return of the material during the assembly, when the proximal portion of the body 30 is inserted at the parts 3, 5. This portion, with a larger cross section than that of the proximal portion of the body 30, can be located on the tip 50 (on the distal 52a or proximal 52b portion thereof) or on the distal portion of the body 30. This portion is thus advantageously located before the area of the body 30 of a minimum pitch P, i.e. distally relative thereto.

The fastening component 1, or at least the tip 50, advantageously comprises a surface treatment intended to form a thermal barrier. This allows protecting the fastening component 1, or at least the tip 50, from the heating resulting from the friction between the fastening component 1 and the first and second parts 3, 5 as well as from the kneading of the material of the first and second parts 3, 5. Indeed, during the implantation of the fastening component 1, the thermal energy due to the rise in temperature is thus concentrated in the first and second parts 3, 5 by lowering the mechanical properties thereof and without impacting the performance of the fastening component 1. This surface treatment is for example based on a ceramic or carbide. Thus, the fastening component 1, or at least the tip 50, comprises a coating or a thermal insulation layer. In particular, an outer surface of the fastening component 1 or of the tip is thermally more insulating than an inner portion of the fastening component 1.

In addition, the fastening component 1, or at least the tip 50, can advantageously comprise an additional surface treatment intended to increase the thermal conductivity under the thermal insulation layer. Thus, the fastening component 1, or at least the tip 50, may have a sub-layer comprising a thermally conductive material, for example copper or silver. This thermal conduction sub-layer allows reinforcing the thermal protection of the fastening component 1, or at least of the tip 50, by allowing the thermal energy to be diffused and distributed axially along the fastening component 1, thus avoiding the concentration of hotspots.

Furthermore, it is important that the fastening component 1 retains its geometry as long as possible during the perforation phase. To do this, the fastening component 1, at least the tip 50 thereof, can comprise a surface treatment intended to increase its hardness, so that an outer surface of the fastening component 1, or of the tip 50, has a hardness which is higher than that of an inner portion of the fastening component 1. This allows ensuring a hardness differential favorable to the fastening component 1 throughout the implantation cycle. The surface treatment can be a thermal treatment; it can be a surface treatment such as carbonitriding, carburizing, quenching or nitriding type. The surface treatment may alternatively or additionally be a coating, for example of the nickel plating type. Thus, the fastening component 1, or at least the tip 50, may comprise an outer surface of a hardness which is higher than that of an inner portion of the fastening component 1. For example, the outer surface comprises a material of a hardness equal to or greater than 500 HV.

In addition, in order to prevent a deterioration of the mechanical performance of the fastening component 1 during the perforation, the fastening component 1, or at least the tip 50, may comprise a surface treatment intended to reduce the coefficient of friction thereof, for example a film forming or a chemical nickel plating which may include one or several additive(s) such as ceramic. Thus, the fastening component 1, or at least the tip 50, may comprise an outer surface with a coefficient of adhesion which is lower than that of an inner portion of the fastening component 1.

Figure 3:
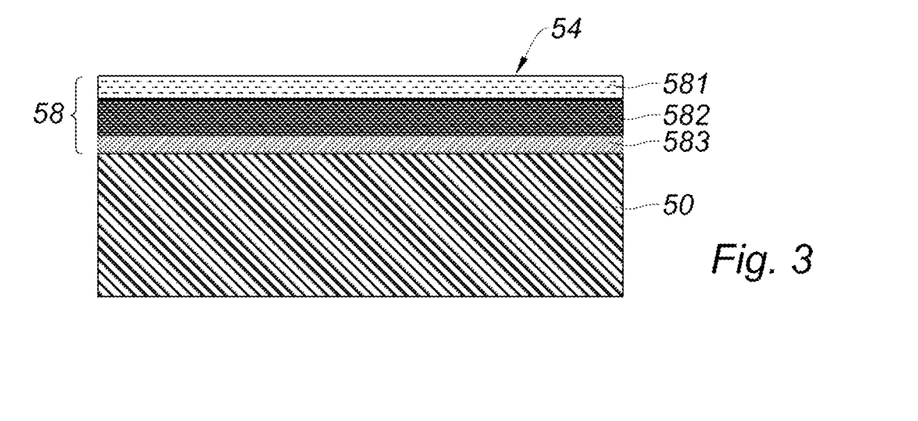
FIG. 3 is a sectional view of portion of a fastening component according to one embodiment of the invention.

As illustrated in FIG. 3, at least the tip 50 of the fastening component 1 thus comprises an outer coating or skin 58 having: a material of a hardness which is higher than that of an inner portion 60 of the fastening component 1, and/or a material of a thermal resistance which is higher than that of the inner portion 60, and/or a material with a coefficient of friction which is lower than that of the inner portion 60. The outer skin 58 may further comprise a material of a thermal conductivity higher than that of the inner portion 60.

This outer skin 58 is formed of several superimposed layers, for example a first layer 581 of higher thermal resistance and/or lower coefficient of friction than the inner portion 60, a second layer 582 of higher hardness and/or a lower coefficient of friction than the inner portion 60, and possibly a third thermal conduction layer 583. The outer skin 58 may comprise a layer of a coefficient of friction which is lower than the inner portion 60 which may be distinct from the other two or three. The outer skin 58 could alternatively comprise a single layer, including for example graphene, or chemical nickel plating including one or several additive(s) such as PTFE, copper or ceramic, configured to both thermally insulate, harden, and reduce the coefficient of friction of the outer surface of at least the tip 50 of the fastening component 1.

It should be noted that the fastening component 1 can comprise two assembled parts.

In particular, at least the distal portion 57b of the tip 50, or the entire tip 50, may be a part distinct from the remainder of the fastening component 1 and can be directly mounted thereon. Thus, the distal portion 57b can be directly mounted on the proximal portion 57a of the tip 50. Where appropriate, the distal portion 57b and the proximal portion 57a may have complementarily shaped junction surfaces.

Figure 7A:
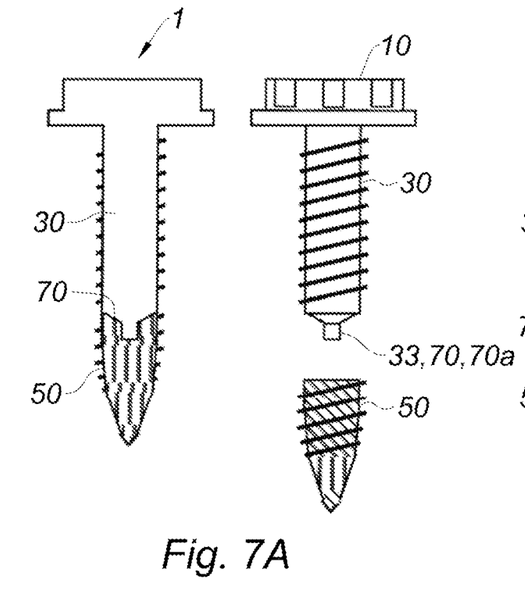
Figure 7B:
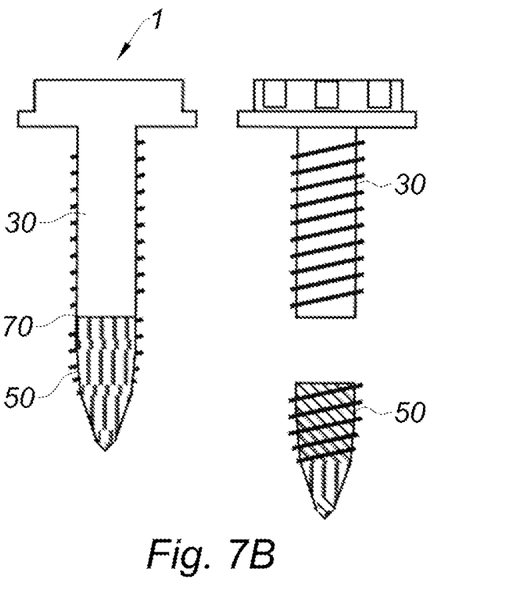
FIG. 7B is a side view of a fastening component according to one embodiment of the invention.

With reference to FIGS. 7A and 7B, the entire tip 50 is a part distinct from the body 30 of the fastening component 1 and can be directly mounted thereon. The tip 50, in particular the proximal end 52b thereof, and the body 30, in particular the distal end 32b thereof, may for this purpose have a complementary shape.

According to FIG. 7A, a tenon 33, for example herein secured to the body 30, is nested into a housing 53, for example herein secured to the tip 50.

The securing of the tip 50 and the body 30 can be carried out, for example, by a welding, a gluing or a crimping. Where appropriate, the securing of the distal portion 57b of the tip 50 and of the proximal portion 57b thereof can be carried out, for example, by a welding, a gluing or a crimping.

The tip 50, or the distal portion 57b thereof, may advantageously comprise a material of a hardness which is higher than that of a material of the body 30, or of the proximal portion 57a of the tip 50. For example, the tip 50, or the distal portion 57b thereof, comprises carbide, ceramic, graphene or a steel of a hardness which is higher than a steel of the body 30 or the head 10, or the proximal portion 57a. This embodiment is particularly advantageous in the case where the tip 50 is directly mounted on the body 30, or the distal portion 57b thereof is directly mounted on the proximal portion 57a thereof.

As illustrated in particular in FIGS. 1A, 1B, 2 and 6A, the fastening component 1 further comprises a divisible area 70 intended to be broken in order to detach the tip 50 from the body 30 after perforation of the first and second parts 3, 5. This divisible area 70 links the tip 50 and the body 30. This divisible area 70 is arranged at the distal end 32b of the body 30 and at the proximal end 52b of the tip 50.

The divisible area 70 is a weakness area provided between the tip 50 and the body 30 of the fastening component 1. The divisible area 70 is therefore a predetermined area of a lower mechanical resistance of the fastening component 1. This divisible area 70 defines the cut-off area of the fastening component 1 which is configured to break under the effect of an effort with a component orthogonal to the axis A exerted on the tip 50. The divisible area 70 is interposed between the fastener which fastens the body 30 of the fastening component 1 to the first and second parts 3, 5 and the tip 50 which becomes unnecessary after drilling and should therefore advantageously be ejected.

The divisible area 70 may be a portion 70a of reduced thickness, or reduced transverse section relative to the axis A, in particular a portion with a diameter restriction, that is to say of a diameter smaller than that of the body 30 and to a diameter of the tip 50. The divisible area 70 is preferably a solid portion, that is to say non-hollow. The fastening component 1 may comprise a single divisible portion 70a, which is preferably arranged at the center of the body 30 and the tip 50. The portion 70a advantageously extends parallel to the axis A. The portion 70a may have a revolving shape, for example cylindrical, conical or frustoconical, in order to promote the breakage thereof.

The divisible area 70 may have the shape of an annular groove extending about the axis A. The divisible area 70 may be the tenon 33 nested to the tip 50 according to the example of FIG. 7A. According to FIGS. 7A and 7B, the divisible area 70 may be the joint plane between the tip 50 and the body 30, or the joint plane between the distal portion 57b and the proximal portion 57a of the tip 50.

The divisible area 70 can be obtained by rolling.

The invention also concerns a method for assembling a first part 3 and a second part 5 via a fastening component 1 having all or part of the features described above, the method comprising the fact of:

rotating the fastening component 1 about the axis A;

drilling the first and second parts 3, 5 by means of the tip 50 of the fastening component 1;

breaking the divisible area 70 after the tip 50 has drilled the first and second parts 3, 5.

The drilling of the first and second parts 3, 5 can be carried out by an axial thrust effort exerted on the fastening component 1, in particular on the head 10.

The drilling of the first and second parts 3, 5 can be carried out while the fastening component 1 pivots about the axis A.

The rotation of the fastening component 1 about the axis A can advantageously precede the drilling, be concomitant with the drilling, or occur after the drilling has started. The rotation can be carried out via a tool intended to exert a torque on the head 10 of the fastening component 1.

The breakage of the divisible area 70 comprises the application on the tip of a force having a component orthogonal to the axis A. This force may be of a variable direction about the axis A. For example, the method comprises contacting the tip 50 with a bearing tool such as a slanting spacer 102, having a plane 104 inclined relative to the axis A, after drilling first and second parts 3, 5, to break the divisible area 70. This tool or slanting spacer 102 can be fastened or movable, for example in rotation about the axis A and/or in translation along the axis A, as illustrated in FIGS. 4 and 5A to 5D.

The method also comprises an anchoring of the fastening component 1 in the first and second parts 3, 5. This anchoring is carried out via the fastener of the body 30, that is to say in particular by the engagement of the protruding element(s) 32 in the first and second parts 3, 5. There may also be a plating of the first and second parts 3, 5 against each other.

Figure 4:
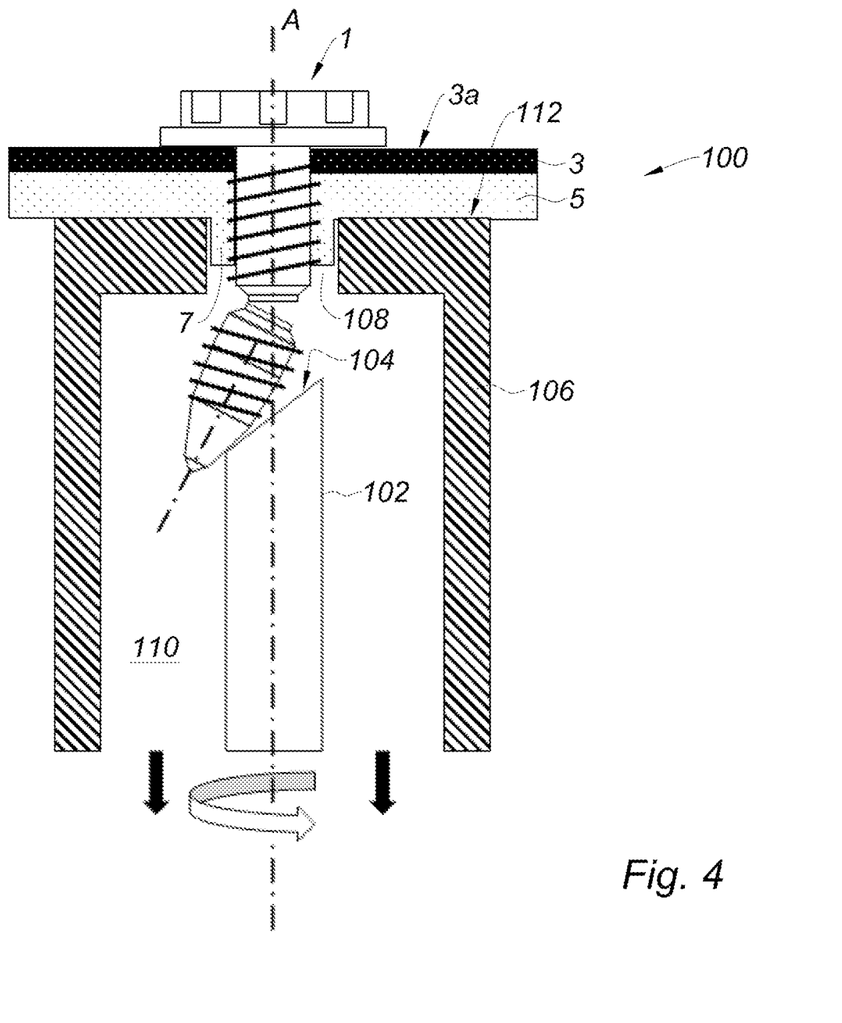
FIG. 4 is a view illustrating a step of an assembly method according to one embodiment of the invention.

As shown in FIG. 4, the method may comprise the shaping of a collar 7 around the body 30 of the fastening component 1 during the drilling. This collar 7 can be formed by means of a counter anvil 106 having a housing 108 intended to shape the collar 7. This collar 7 therefore has the particularity of having a predetermined shape, obtained herein by guiding the material in the housing 108. The housing 108 extends, for example, to the right of the bearing tool or slanting spacer 102.

As illustrated in FIGS. 5A to 5D, the method may comprise a step of collecting the detached tip 50, for example by suction.

The invention also relates to an assembly device 100 intended for the implementation of the assembly method described above, the device 100 comprising:

a bearing tool, such as a slanting spacer 102, configured to bear against the tip 50 in order to cause the breakage of the divisible area 70 of the fastening component 1 after the point 50 of the fastening component has drilled the first and second parts 3, 5, a counter anvil 106 having a housing 108 intended to shape a collar 7 around the body 30 of the fastening component 1. The counter anvil has a proximal face 112 intended to bear against a distal face of the second part 5.

The assembly device 100 may further comprise a discharge member configured to discharge the tip 50 detached from the body 30. The discharge member may comprise a discharge conduit 110 allowing discharging the tip 50 from the slanting spacer 102 to a collection container (not represented), by gravity or via a suction unit (not represented).

Of course, the invention is in no way limited to the embodiment described above, this embodiment having been given only by way of example. Changes are possible, in particular from the point of view of the constitution of the various devices or by the substitution of technical equivalents, without departing from the field of protection of the invention.

The invention claimed is:

1. A fastening component intended for assembly of a first part and a second part, wherein the fastening component comprises:
   a body extending longitudinally along an axis,
   a head configured to allow a rotation of the fastening component about the axis, and
   a drilling tip linked to the body, wherein
   the body has a lateral wall comprising a fastener configured to fasten the body to the first part and the second part,
   the drilling tip has a lateral wall of a shape distinct from that of a surface of revolution, wherein the drilling tip has a non-threaded tapered distal end, from the non-threaded tapered distal end of the drilling tip, an increasing cross section of an elliptic, ovoid, or polygonal shape, and
   the drilling tip and the body are linked by a divisible area configured to be broken in order to detach the drilling tip from the body, wherein the drilling tip includes one or more radially protruding elements which radially protrude from the lateral wall of the drilling tip, and
   wherein the divisible area is an annular groove interposed between the fastener of the body and the one or more radially protruding elements of the drilling tip.

2. The fastening component according to claim 1, wherein the divisible area is a portion of smaller section.

3. The fastening component according to claim 1, wherein the fastener comprises one or several radially protruding element(s) arranged at a pitch decreasing in a proximal direction, and/or the drilling tip has one or several radially protruding element(s) of a diameter increasing in the proximal direction.

4. The fastening component according to claim 1, wherein at least the drilling tip comprises an outer surface of a higher hardness, a higher thermal resistance and a lower coefficient of friction, than an inner material of the fastening component.

5. The fastening component according to claim 1, wherein the drilling tip, or a distal portion of the drilling tip, is directly mounted on a remainder of the fastening component and comprises a material distinct from a material of the remainder of the fastening component.

6. A method for assembling a first part and a second part via a fastening component, wherein the fastening component comprises: a body extending longitudinally along an axis, a head configured to allow a rotation of the fastening component about the axis, and a drilling tip linked to the body, wherein the body has a lateral wall comprising a fastener configured to fasten the body to the first part and the second part, the drilling tip has a lateral wall of a shape distinct from that of a surface of revolution, wherein the drilling tip has a non-threaded tapered distal end, from the non-threaded tapered distal end of the drilling tip, an increasing cross section of an elliptic, ovoid, or polygonal shape, and the drilling tip and the body are linked by a divisible area configured to be broken in order to detach the drilling tip from the body, wherein the drilling tip includes one or more radially protruding elements which radially protrude from the lateral wall of the drilling tip, and wherein the divisible area is an annular groove interposed between the fastener of the body and the one or more radially protruding elements of the drilling tip, the method comprising the steps of:
   rotating the fastening component about the axis;
   drilling the first and second parts by means of the drilling tip; and
   breaking the divisible area after the drilling tip has drilled the first and second parts.

7. The method according to claim 6, wherein breaking of the divisible area comprises application, on the drilling tip, of a force having a component orthogonal to the axis.

8. The method according to claim 7, wherein the force is of a variable direction.

9. The method according to claim 6, wherein the method comprises shaping a collar around the body of the fastening component.

10. An assembly device intended for implementation of the method according to claim 6, the device comprising:
    a bearing tool configured to cause breakage of the divisible area of the fastening component after the drilling tip of the fastening component has drilled the first and second parts,
    a counter anvil having a housing intended to shape a collar around the body of the fastening component.

11. The fastening component according to claim 2, wherein the fastener comprises one or several radially protruding element(s) arranged at a pitch decreasing in a proximal direction, and/or the drilling tip has one or several radially protruding element(s) of a diameter increasing in the proximal direction.

12. The fastening component according to claim 11, wherein at least the drilling tip comprises an outer surface of a higher hardness, a higher thermal resistance and a lower coefficient of friction, than an inner material of the fastening component.

13. The fastening component according to claim 12, wherein the drilling tip, or a distal portion of the drilling tip, is directly mounted on a remainder of the fastening component and comprises a material distinct from a material of the remainder of the fastening component.

14. The fastening component according to claim 2, wherein at least the drilling tip comprises an outer surface of a higher hardness, a higher thermal resistance and a lower coefficient of friction, than an inner material of the fastening component.

15. The fastening component according to claim 14, wherein the drilling tip, or a distal portion of the drilling tip, is directly mounted on a remainder of the fastening component and comprises a material distinct from a material of the remainder of the fastening component.

16. The fastening component according to claim 3, wherein at least the drilling tip comprises an outer surface of a higher hardness, a higher thermal resistance and a lower coefficient of friction, than an inner material of the fastening component.

17. The fastening component according to claim 16, wherein the drilling tip, or a distal portion of the drilling tip, is directly mounted on a remainder of the fastening component and comprises a material distinct from a material of the remainder of the fastening component.

18. The fastening component according to claim 2, wherein the drilling tip, or a distal portion of the drilling tip, is directly mounted on a remainder of the fastening component and comprises a material distinct from a material of the remainder of the fastening component.

19. The fastening component according to claim 3, wherein the drilling tip, or a distal portion of the drilling tip, is directly mounted on a remainder of the fastening component and comprises a material distinct from a material of the remainder of the fastening component.

20. The fastening component according to claim 4, wherein the drilling tip, or a distal portion of the drilling tip, is directly mounted on a remainder of the fastening component and comprises a material distinct from a material of the remainder of the fastening component.

21. An assembly device intended for implementation of a method for assembling a first part and a second part via a fastening component, wherein the fastening component comprises: a body extending longitudinally along an axis, a head configured to allow a rotation of the fastening component about the axis, and a drilling tip linked to the body, wherein the body has a lateral wall comprising a fastener configured to fasten the body to the first part and the second part, the drilling tip has a lateral wall of a shape distinct from that of a surface of revolution, wherein the drilling tip has, from a distal end of the drilling tip, an increasing cross section of an elliptic, ovoid, or polygonal shape, and the drilling tip and the body are linked by a divisible area configured to be broken in order to detach the drilling tip from the body, wherein the drilling tip includes one or more radially protruding elements which radially protrude from the lateral wall of the drilling tip, and wherein the divisible area is an annular groove interposed between the fastener of the body and the one or more radially protruding elements of the drilling tip, the method comprising the steps of:

- rotating the fastening component about the axis;
- drilling the first and second parts by means of the drilling tip; and
- breaking the divisible area after the drilling tip has drilled the first and second parts, the device comprising:
- a bearing tool configured to cause breakage of the divisible area of the fastening component after the drilling tip of the fastening component has drilled the first and second parts,
- a counter anvil having a housing intended to shape a collar around the body of the fastening component.

* * * * *